United States Patent
Sreenivas (10) Patent No.: US 10,013,595 B2
(45) Date of Patent: Jul. 3, 2018

(54) CORRELATING FINGERPRINTS TO POINTING INPUT DEVICE ACTIONS

(71) Applicant: Hewlett-Packard Development Company, L.P., Houston, TX (US)

(72) Inventor: Bharathi Sreenivas, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 25 days.

(21) Appl. No.: 15/100,198

(22) PCT Filed: Nov. 28, 2013

(86) PCT No.: PCT/IN2013/000721
§ 371 (c)(1),
(2) Date: May 27, 2016

(87) PCT Pub. No.: WO2015/079450
PCT Pub. Date: Jun. 4, 2015

(65) Prior Publication Data
US 2017/0039414 A1   Feb. 9, 2017

(51) Int. Cl.
*G06K 9/00* (2006.01)
*G06F 3/041* (2006.01)
*G06F 21/32* (2013.01)

(52) U.S. Cl.
CPC ......... *G06K 9/00087* (2013.01); *G06F 3/041* (2013.01); *G06F 21/32* (2013.01); *G06K 9/0004* (2013.01); *G06F 2203/04104* (2013.01)

(58) Field of Classification Search
CPC .................... G06F 21/32; G06F 3/041; G06F 2203/04104; G06K 9/0004; G06K 9/00087

USPC ......... 382/131, 194; 345/156, 173, 175, 174
See application file for complete search history.

(56) References Cited

U.S. PATENT DOCUMENTS

| | | | |
|---|---|---|---|
| 9,817,542 B2* | 11/2017 | Laubach | G06F 3/04812 |
| 9,864,461 B2* | 1/2018 | Rosenberg | G06F 3/0416 |
| 2008/0042983 A1 | 2/2008 | Kim et al. | |
| 2009/0109194 A1 | 4/2009 | Weng et al. | |
| 2010/0265204 A1 | 10/2010 | Tsuda | |

(Continued)

FOREIGN PATENT DOCUMENTS

| | | |
|---|---|---|
| CN | 101364159 A | 2/2009 |
| CN | 103019452 A | 4/2013 |

OTHER PUBLICATIONS

State Intellectual Property Office of the PR China(ISA/CN), International Search Report and the Written Opinion for PCT/IN2013/000721 dated May 28, 2016 (12 pages).

(Continued)

*Primary Examiner* — Mekonen Bekele
(74) *Attorney, Agent, or Firm* — HPI Patent Department (57) ABSTRACT

An example electronic device (10) is provided. The electronic device (10) includes a screen (32), at least one electronic component (34) to detect at least one finger contacting the screen (32), and at least one processor (30) having a control unit (33). The control unit (33) processes data from the at least one electronic component (34) indicating that a first finger is contacting the screen (32), identifies a first finger image associated with the first finger, and correlates the contact of the first finger and the identified first finger image to a first action of a pointing input device to perform a first operation on the electronic device (10).

16 Claims, 6 Drawing Sheets

(56) References Cited

U.S. PATENT DOCUMENTS

| | | | |
|---|---|---|---|
| 2011/0009813 A1* | 1/2011 | Rankers | A61B 5/157 604/66 |
| 2011/0291988 A1* | 12/2011 | Bamji | G06F 3/0428 345/175 |
| 2012/0044156 A1 | 2/2012 | Michaelis et al. | |
| 2012/0127179 A1* | 5/2012 | Aspelin | G06F 21/32 345/441 |
| 2012/0235956 A1* | 9/2012 | Wang | G06F 3/0421 345/175 |
| 2012/0242581 A1* | 9/2012 | Laubach | G06F 3/04812 345/168 |
| 2012/0306767 A1* | 12/2012 | Campbell | G06F 3/04886 345/173 |
| 2013/0201155 A1* | 8/2013 | Wu | G06F 3/03547 345/174 |
| 2014/0002339 A1* | 1/2014 | Guard | G06F 3/04895 345/156 |
| 2017/0039414 A1* | 2/2017 | Sreenivas | G06F 3/041 |
| 2017/0344734 A1* | 11/2017 | Zhou | G06F 1/1692 |
| 2018/0067624 A1* | 3/2018 | Laubach | G06F 3/04883 |

OTHER PUBLICATIONS

The International Bureau of WIPO, International Preliminary Report on Patentability for PCT/IN2013/000721 dated Jun. 14, 2016 (5 pages).

\* cited by examiner

CORRELATING FINGERPRINTS TO POINTING INPUT DEVICE ACTIONS

CROSS-REFERENCE TO RELATED APPLICATION

This application is a U.S. National Stage Application of and claims priority to International Patent Application No. PCT/IN2013/000721, filed on Nov. 28, 2013, and entitled "ELECTRONIC DEVICE," which is hereby incorporated by reference in its entirety.

BACKGROUND

There has been dramatic improvement in the development of various electronic devices over the past years. Increasing number of today's users carry one or more electronic devices that are equipped with a diverse set of functions. These devices can communicate with each other, reach the Internet, perform different tasks, or access various data services through networks. Various devices such as personal computers, all in one computing devices, Internet-enabled tablets, smart phones, laptops, televisions, and gaming consoles have become essential personal accessories, connecting users to friends, work, and entertainment. Users now have more choices and expect to efficiently access programs, data, and other content on all types of devices at all times. The large number of users that utilize different type of electronic devices stimulates providers to offer devices that can meet the increase in user demand, support the broad array of available services, and provide reliable communication.

DETAILED DESCRIPTION

With the recent improvements in technology, electronic devices (e.g., tablets, personal computers, laptops, smartphones, etc.) continue to play an increasing role in people's life. Different users rely on different type of electronic devices for many day-to-day activities and work related tasks. With the recent development and increased popularity of advanced mobile or handheld electronic devices, many of these devices include a touchscreen and have applications and programs that are developed specifically for this type of devices.

A touchscreen of an electronic device is an electronic visual display screen that displays variety of images and that can be controlled by the user through simple or multi-touch gestures by touching the screen with at least one finger. Some touchscreens may also detect objects such as a stylus. The user can utilize the touchscreen to control operations on the electronic device, to respond to any displayed content (e.g., messages, emails, etc.), and to control how the content is displayed on the screen (e.g., by zooming the text or image size).

Therefore, an electronic device with a touchscreen enables a user to interact with the electronic device and the content displayed on the display screen directly, rather than indirectly with an external mouse or a touchpad. Contacting or touching the top surface of the electronic device with a finger allows a user to perform different tasks, such as moving a pointer on the screen, selecting objects, and opening files and folders. Thus, the touchscreen allows a user to interact with the display screen and the electronic device without requiring any intermediate device that would usually be held in the hand of a user.

However, in many situations, in addition to a single touch on the screen a user of an electronic device needs to perform extra steps in order to execute certain commands or functions on the electronic device. These steps may involve tapping a key or a button on the device to locate a menu command from a context menu (e.g., a general context menu or a content menu for a specific application) displayed on the device, or tapping a button on the device to perform common commands and shortcuts such as copy, paste, undo, delete, etc. For that reason, many electronic devices also include soft keys or buttons that are typically positioned on the exterior of the electronic device, outside of the touchscreen area. Such keys or buttons may be positioned below, above, or beside the touchscreen and may operate in a similar manner to the buttons on a computer mouse. Therefore, executing certain commands or functions on the electronic devices always involves an extra step, which is time consuming and burdensome to the user.

In addition, security is always a concern for users of electronic devices. Many users operate electronic devices that store important and, sometimes, classified information that must be kept confidential. Although there are some available protection mechanisms for such electronic devices, an additional step of security that can protect the content of the device is always desired. Further, authorized users of such electronic devices may also desire to share their access of such touchscreen devices with other users and, at the same time, keep the main level of control of the device to restrict a new user or add another new user at any time.

The present description is directed to electronic devices, methods, and computer readable media for controlling the electronic device. Specifically, the present description proposes a novel and previously unforeseen approach for controlling electronic devices by utilizing images of the user's fingers to operate as buttons of a pointing input device (e.g. a mouse). The proposed description is applicable to a large set of electronic devices and can be used in many different industries.

In particular, the disclosed electronic devices, methods, and computer readable media propose capturing finger images associated with the fingers of a user with the touchscreen of the electronic device and storing these finger images in a memory. A user of the device may then associate a first finger image with a first action (e.g., left mouse click) of a pointing input device so detection of the first finger image operates as a first button of the pointing input device.

The user can also associate a second finger image with a second action (e.g., right mouse click) of the pointing input device, so detection of the second finger image operates as a second button of the pointing input device. The user of the electronic device may decide which fingers, and consequently which fingerprints, to associate with the specific actions of the pointing input device. The user may also change his or her selection of the fingers at any time.

After the association of the finger images and the actions of the pointing input device is completed, the electronic device may detect the fingers of the user contacting the screen and identify the stored finger images associated with the actions of the pointing input device. The proposed electronic device can correlate the contact of the fingers and the identified finger images to either the first action of the second action of the pointing input device to perform an operation (e.g., open a context menu) on the electronic device. In addition, the electronic device can determine a location of the first finger and the second finger on the screen of the device, and can correlate the contact of the first finger and the second finger with the first and the second action of the pointing input device based on the identified finger image and the location of the finger. That way, the electronic device may execute one operation if the finger image associated with the right click is detected over an application icon (i.e., it can open a context menu associated with that application), and perform another operation if the finger image associated with the right click is detected over an empty area of the screen (i.e., it can open a main context menu).

In addition, the stored finger images may be used for identification and security purposes. A user of the device may "lock" the device and the device can only be unlocked by a specific finger image or a combination of finger images that is predetermined by the user. This feature can make any electronic device completely personalized and can add an extra level of security to the device. Further, an authorized user of the electronic device may share the access of the device with a new user by allowing the new user to scan and associate his or her finger images with the actions of the pointing input device. At the same time, the authorized use can maintain control of the device and can add or remove users as desired.

The proposed implementation creates a much more interactive user interface for a touchscreen electronic device. The user interface of the electronic device is very easy to use as it is similar to a regular mouse device on a laptop. The proposed implementation allows the electronic device to work with pre-existing mouse software and also allows for a simple development of new applications.

In an example implementation, an electronic device is provided. The electronic device includes a screen (e.g., a touchscreen) and at least one electronic component to detect at least one finger contacting the screen. The electronic device also includes at least one processor having a control unit to process data from the at least one electronic component indicating that a first finger is contacting the screen, identify a first finger image (e.g., a fingerprint) associated with the first finger, and correlate the contact of the first finger and the identified first finger image to a first action of a pointing input device to perform a first operation on the electronic device. Additionally, the control unit is process data from the at least one electronic component indicating that a second finger is contacting the screen, identify a second finger image associated with the second finger, and correlate the contact of the second finger and the identified second finger image to a second action of the pointing input device to perform a second operation on the electronic device.

In another example implementation, a method for controlling an electronic device is provided. As with other methods described in this disclosure, the method can be performed by a processor of the electronic device. For instance, a non-transitory machine-readable storage medium may store computer programs or modules, which when executed by the electronic device cause the method to be performed. The method includes identifying a first fingerprint from a first finger touching a screen of the electronic device, identifying a second fingerprint from a second finger touching the screen, and determining a location of the first finger and the second finger on the screen. The method also includes executing a first action of a pointing input device to perform a first operation on the electronic device based on the identified first fingerprint and the location of the first finger. The method further includes executing a second action of the pointing input device to perform a second operation on the electronic device based on the identified second fingerprint and the location of the second finger.

As used herein, the term "electronic device" refers to any one of various smartphones, cellular telephones, tablets, personal data assistants (PDA's), laptops, computers, servers, and other similar electronic devices that include a display touchscreen, a processor, and are capable of displaying images on the display screen.

As used herein the terms "finger image" and "fingerprint" are to be used interchangeably and refer to an image of a finger or a portion of a finger that may be proximate to or is touching the surface of a display screen. This image of a finger can include a fingerprint, the shape of the finger, the finger tip, the side of a finger, the veins of the finger, or any other detectable portion of a finger that can identify the finger of a particular user.

As used herein the terms "authorized user," "main user," and "primary user" are to be used interchangeably and refer to the principal user of the electronic device. The principal user of the electronic device may or may not be the owner of the device but is the person who uses the device on a regular basis and is able to modify the settings of the device.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

Figure 1:
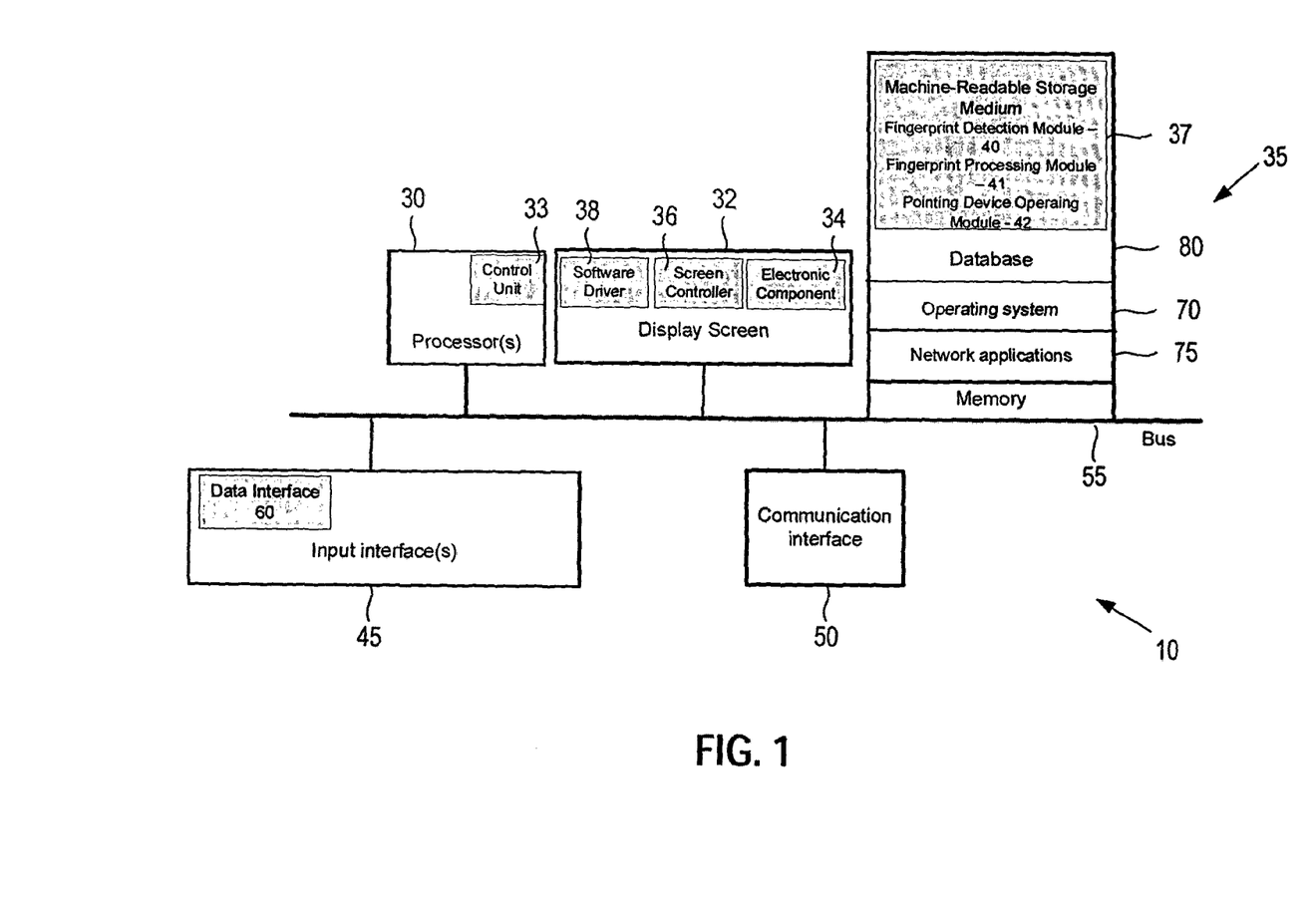
FIG. 1 is a schematic illustration of an example of an electronic device in accordance with an implementation of the present disclosure.

FIG. 1 is a schematic illustration of an example of an electronic device 10 capable of carrying out the techniques described below. The electronic device 10 may be a mobile electronic device (e.g., a smartphone), a stationary electronic device (e.g., a desktop computer), or a convertible electronic device (e.g., a conversable laptop). For example, the electronic device 10 may be a tablet, a laptop, a personal computer, an all in one computing device, a gaming console, a server, a mobile telephone, a music player, a visual player, a personal digital assistant (PDA), a cellular telephone, an electronic notepad, a plurality of distributed computing devices, or any other suitable electronic device that includes a display screen that is operable to obtain and recognize an image of a finger (e.g., fingerprint, finger shape, etc.). In the illustrated example, the electronic device 10 includes at least one processor 30, a display screen 32, a memory resource 35, a communication interface 50, and input interface(s) 45.

In one example, the electronic device 10 is a hand held device (e.g., smartphone, tablet, etc.), where the user may hold electronic device 10 with one hand while operate it with the other hand. Regardless whether the device is hand held or not, a user may operate the device by touching the display screen 32 to provide commands to the processor 30 of the electronic device 10. As explained in additional details below, the display screen 32 includes components (e.g., hardware and software) to scan and recognize fingerprints and to display images.

As explained in additional detail below, the electronic device 10 includes software, hardware, or a suitable combination thereof configured to enable functionality of the electronic device 10 and to allow it to carry the techniques described below. For example, the electronic device 10 includes communication interfaces (e.g., a Wi-Fi® interface, a Bluetooth® interface, a 3G interface, a 4G interface, a near filed communication (NFC) interface, etc.) that are used to connect with external devices/systems (not shown) and/or to a network (not shown). The network may include any suitable type or configuration of network to allow for communication between the electronic device 10 and any external devices/systems.

The processor 30 (e.g., a central processing unit, a group of distributed processors, a microprocessor, a microcontroller, an application-specific integrated circuit (ASIC), a graphics processor, a multiprocessor, or another suitable controller or programmable device), the memory resource 35, the input interfaces 45, and the communication interface 50 are operatively coupled to a bus 55. In other examples, the electronic device 10 includes additional, fewer, or different components for carrying out similar functionality described herein.

The display screen 32 provides visual information to a user, such as various display windows, icons, tabs, video images, pictures, etc. The display screen 32 may also display content from different applications running on the electronic device 10 on a window shown on the display screen. The display screen 32 may be a transparent liquid crystal display (LCD), an organic light emitting diode (OLED) display, a plasma display, or any other suitable display. The display screen 32 may be part of the electronic device 10 (e.g., when the electronic device 10 is tablet or all in one device), may be a separated component that is in electronic communication with the electronic device 10 (e.g., when the electronic device is a desktop computer with a separate monitor), and may be a detachable component that may also be used as a handheld device (e.g., when the electronic device 10 is a convertible computing device). The display 32 may be of different sizes and may support various types of display resolution.

The entire display screen 32 or at least a portion of the display 32 can be touch sensitive (i.e., the screen is a touchscreen) for detecting contact with an object and for providing input to the electronic device 10. A touchscreen allows a user to use an object (e.g., a finger, stylus, etc.) to contact the upper surface of the display screen 32. The specific details of the touch (e.g., type of motion, location, pressure, duration, etc.) provide different information and/or commands to the electronic device 10 for processing.

It is to be understood that the display screen 32 of the electronic device 10 may include various configurations and is operable to obtain and recognize an image of a finger (e.g., fingerprint, finger shape, etc.) that is proximate to or is contacting the surface of display screen 32. It is to be understood that the image of a finger may include a fingerprint, the finger tip, the shape of the finger, the veins of the finger, or any other detectable portion of a finger that can identify a specific finger of a user. Although the processes described below refer to using a fingerprint, any other suitable identification of a finger may also be used to perform the same functions.

In one example, the display screen 32 includes touchscreen panel (not shown) that is positioned above a display panel (not shown). The electronic device 10 also includes at least one electronic component 34 (e.g., sensor, optical fiber, etc.) or different combinations of electronic and/or hardware components 34 to identify the point of contact, and to scan and detect the fingers and finger images of a user. The at least one electronic component 34 may or may not be included in the screen 32. In one implementation, the electronic components of the display screen 32 may include a plurality of sensors positioned on the touchscreen panel that are in communication with the processor 30. In another example, the electronic components of the display screen 32 may include a plurality of optical fibers bundled together into a single flat surface. The optical fibers are operable to scan and detect an image of a finger, and to capture control commands by a user received through simple or multi-touch gestures of touching the screen. In yet another example, the electronic components of the display screen may include groups of charged-coupled devices operable to detect and capture an image of a finger. It is to be understood that the display screen 32 may implement any other type of technology that can be used to detect the image of a finger contacting the screen 32.

The display screen 32 also includes a screen controller 36 that processes the signals received from the touchscreen panel and its electronic components 34 and translates these into touch event data (i.e., location of contact, detected fingerprints, etc.), which is passed to the processor 30 of the electronic device 10 (e.g., via the bus 55). The display screen also includes a software driver 38 that provides an interface to the operating system 70 of the device 10 and translates the touch event data into mouse events (e.g., click, drag, etc.). This allows the screen 32 to work with a vast amount of pre-existing mouse driven software.

The communication interface 50 enables the electronic device 10 to communicate with plurality of networks and communication links. The input interfaces 45 can receive information from any internal or external devices/systems in communication with the electronic device 10. In one example, the input interfaces 45 include at least a data interface 60. In other examples, the input interfaces 45 can include additional interfaces. In one example, the data interface 60 receives information about images of fingers of potential users of the electronic device 10. For example, the data interface 60 can receive fingerprints (e.g., from any external device or system) for potential users of the device 10 and, when requested, may store this information in a memory.

The processor 30 includes a controller 33 (also called a control unit) and may be implemented using any suitable type of processing system where at least one processor executes computer-readable instructions stored in the memory 35. The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory 35 may also be used for storing temporary variables or other intermediate information (e.g., fingerprints, etc.) during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices, such as a keyboard, a keypad, a mouse, or a touch input object (e.g., a finger); sending output to a projector and a camera; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols including TCP/IP, HTTP, Ethernet, USB, and FireWire.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement a fingerprint detection module 40, a fingerprint processing module 41, and a pointing device operating module 42. In other examples, the instructions can implement more or fewer modules (e.g., various other modules related to the operation of the system 10). The modules 40, 41 and 42 may include, for example, a hardware device including electronic circuitry for implementing the functionality described below, such as control logic and/or memory. As mentioned above, in addition or as an alternative, the modules 40, 41 and 42 may be implemented as a series of instructions encoded on a machine-readable storage medium and executable by a processor.

As explained in additional detail below, the fingerprint detection module 40 detects and identifies finger images associated with the fingers of a user that contact the top surface of the display screen 32. The fingerprint processing module 41 processes finger images of the user of the electronic device 10 and associates the finger images with actions of a pointing input device of the electronic device. Further, the pointing device operating module 42 correlate the contact of a finger and the identified finger image to an action of a pointing input device to perform a first operation on the electronic device 10.

Information and data associated with the system 10 and other systems/devices can be stored, logged, processed, and analyzed to implement the control methods and processes described herein. For example, the memory 35 may include at least one database 80. In other implementations, a database may be stored remotely of the electronic device 10 (e.g., can be accessed via a cloud). In one example, information about the images of the fingers associated with different users of the device 10 can be stored in the database 80.

As noted earlier, when using the electronic device 10 with the touchscreen 32 a user may need to perform extra steps in order to execute certain commands or functions on the electronic device. For example, when a user wants to locate and execute a menu command from a context menu or wants perform common shortcut commands (e.g., copy, paste, undo, delete, etc.), a user may need to press a soft key or button on the device to perform these commands. Thus, executing certain commands or functions on the electronic devices always involves an extra step, which creates a burden to the user.

The techniques described below propose controlling the electronic device 10 by using images of the user's fingers to operate as buttons of a pointing input device (e.g. a mouse). In particular, the disclosed techniques propose capturing finger images of a user, storing the images, and associating the finger images with different actions of the pointing input device (e.g., left mouse click, right mouse click). The electronic device 10 may detect the fingers of the user contacting the screen and identify the stored finger images associated with the actions of the pointing input device. The electronic device can also correlate the contact of the fingers and the identified finger images to either a first action or a second action of the pointing input device to perform operations (e.g., open a context menu) on the electronic device. Thus, detection of the finger images of the user operates as a buttons of the pointing input device. In addition, the electronic device can determine a location of the fingers on the screen 32 of the device 10, and can correlate the contact of a first finger and a second finger with the first and the second action of the pointing input device based on the identified finger image and the location of the finger.

Figure 2:
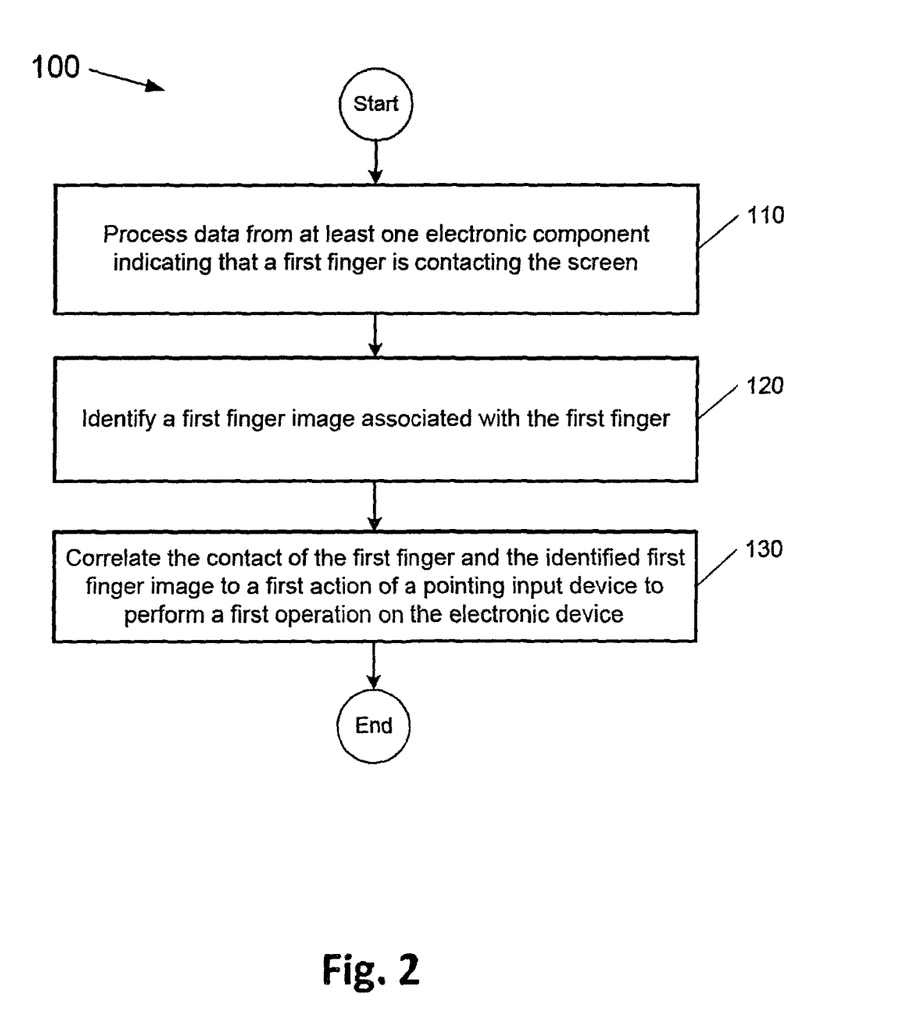
FIG. 2 illustrates a flow chart showing an example of a method for controlling an electronic device in accordance with an implementation of the present disclosure.

FIG. 2 illustrates a flow chart showing an example of a method 100 for controlling an electronic device. In one example, the method 100 can be executed by the control unit 33 of the processor of the electronic device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions encoded on a non-transitory machine-readable storage medium 37 executable by a processor 30 of the electronic device 10. In one example, the instructions for the method 100 implement the fingerprint detection module 40, the fingerprint processing module 41, and the pointing device operating module 42.

The method 100 begins at block 110, where the control unit 33 processes data from at least one electronic component indicating that a first finger (or a portion of a finger) is contacting or touching the screen 32. In one example, detecting of a finger is performed with a touchscreen panel (not shown) of the display screen 32 that includes a combination of hardware and/or software to identify the point of contact of the user's finger on the display screen 32 and to detect a finger image. In particular, a finger touching the screen 32 may be detected with the at least one electronic component 34. As explained in additional detail below, the data from the component(s) 34 is provided to the control unit 33 for processing. The user may touch the display screen 32 with one of the fingers on his or her hand (e.g., index finger, middle finger, etc.) or with a combination of his or her fingers. In some implementations, before the user starts using the device 10, the user may be required to provide identification in order to verify that he or she is an authorized user of the device. The provided identification may be in the form of a password (e.g., a string of characters), in the form of a finger image, or may be a combination of the former.

The electronic device 10 may be used in a regular touch operation mode, where the touchscreen 32 enables the user to interact with the electronic device and the content displayed on a display screen directly by contacting the top surface of the electronic device to perform different tasks. In that regular touch operation mode, the user may not be able to use his or her finger images to control the device 10 as in the finger image control mode described below. In one example, when the user starts the device 10, he or she may be asked to select the mode of operation of the device (e.g., a regular touch operation mode or a finger image control mode). Thus, the user may select the finger image control mode and he or she may switch to regular touch operation mode at any time if he or she desires to do so.

Next, at 120, the control unit identifies a first finger image associated with the first finger. This may be done with the fingerprint detection module 40. For example, the screen controller 36 processes the signals (i.e., the finger touches) received from the touchscreen and translates these into touch event data (i.e., detected fingerprints), which is passed to the processor 30 of the electronic device 10. As noted above, the device 10 (e.g., the display screen 32) includes at least one electronic component 34 for detecting fingerprints of the user. It is to be understood that the control unit 33 may not require a 100% finger match to identify a finger image associated with a finger and to operate in finger image control mode (i.e., where the finger images are used to control the operation of an input pointing device). In order to implement the proposed processes, a 30% match or above (e.g., 40%, 50%, etc.) between the detected finger image and the stored finger images may be sufficient for the control unit 33 to recognize a stored finger image and to proceed with the subsequent elements of the method.

Depending on how many fingers are contacting the screen 32 of the device 10, the control unit 33 may process the received touch event data and identify one fingerprint or a plurality of fingerprints of the user. Therefore, the control unit 33 may also process data indicating that a second finger is contacting the screen, and may identify a second finger image associated with the second finger. As explained in additional detail below, the generated touch event data (i.e., the identified first fingerprint, second fingerprint, etc.) is compared to fingerprints that may be stored in the memory of the electronic device 10 (e.g., in the database 80) to correlate the contact of the first finger and the identified first finger image to a first action of a pointing input device to perform a first operation on the electronic device.

Figure 3:
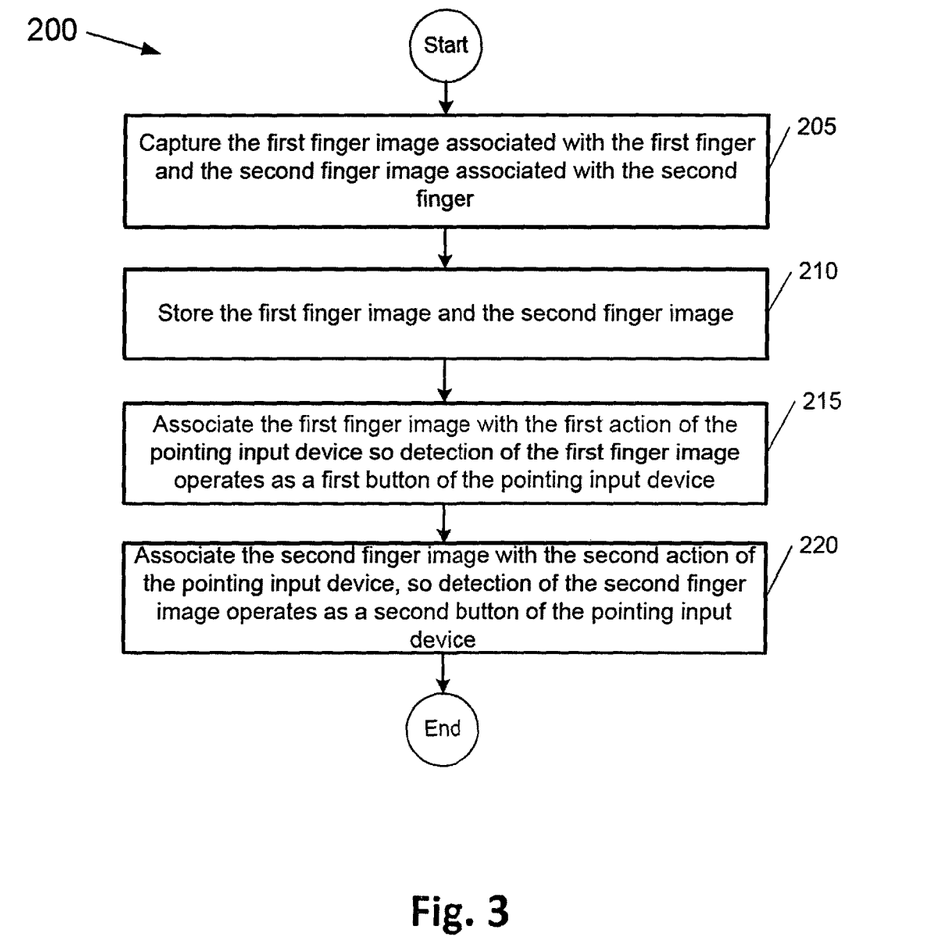
FIG. 3 illustrates a flow chart showing an example of a method for processing a finger image and associating a finger image with an action of a pointing input device of an electronic device in accordance with an implementation of the present disclosure.

FIG. 3 illustrates a flow chart showing an example of a method 200 for processing a finger image and associating a finger image with an action of a pointing input device of the electronic device 10. In one example, the method 200 can be executed by the control unit 33 of the processor of the electronic device 10. Various elements or blocks described herein with respect to the method 200 are capable of being executed simultaneously, in parallel, or in an order that differs from the illustrated serial manner of execution. The method 200 may be executed in the form of instructions encoded on a non-transitory machine-readable storage medium 37 executable by a processor 30 of the electronic device 10. In one example, the instructions for the method 200 implement the fingerprint processing module 41.

The method 200 begins at block 205, where the control unit 33 captures a first finger image associated with a first finger and a second finger image associated with the finger. This may done with the electronic elements 34 of the device 10 when the user contacts the screen for a first time or when the user decides to use the device 10 in a finger image control mode. As noted above, the finger images may be fingerprints and the control unit can capture more than two finger images (e.g., when a user wants to store multiple fingerprints on the device 10). In one example, the first finger is an index finger and the second finger is a middle finger but other fingers may also be used. It is to be understood that portions of the finger images (instead of an entire finger image) may also be captured and used in the processes described below.

At 210, the control unit 33 stores the first finger image and the second finger image (e.g., in the database 80 of the device 10). That way, the electronic device 10 may create a "library" of finger images for the user (or multiple users), where a primary or authorized user can select which of the stored finger images to use to control the device 10 in the manner described below. In addition, finger images of the main user or any other users may be transferred from an external device or a system and saved in the database 80. The control unit 33 then associates the first finger image with the first action of the pointing input device so detection of the first finger image operates as a first button of the pointing input device (at 215). The control unit can also associate the second finger image with the second action of the pointing input device, so detection of the second finger image operates as a second button of the pointing input device (at 220).

The association of the user's finger images with any of the mouse click operations may be performed via a Graphical User Interface ("GUI") of the electronic device 10. For example, via the GUI, the user may select a particular finger or a combination of fingers (i.e., and consequently the corresponding finger image(s)) to be associated with a specific mouse click operation when the user's finger touches the screen 32 and the control unit 33 identifies the finger image of that finger.

The control unit 33 may receive an input from the user of the device 10 regarding which finger image is to be associated with first action of the pointing input device. For example, a user may associate the finger image of his or her index finger with a left mouse click operation (i.e., a first action) and the finger image of this or her middle finger with the right mouse click operation (i.e., a second operation) as these fingers generally perform these operations in a regular computer mouse. However, it is to be understood that a user may decide to associate any of his or her finger images (or a combination of finger images) with any of the mouse click operations (e.g., the right mouse click operation may be associated with an identification of both the middle finger image and the ring finger image). The user may also modify the selected association of his or her finger images with any of the mouse click operations at any time.

In one example, the control unit 33 assigns index values to the finger images stored in the memory 35 of the device 10 (e.g., index value 1 is assigned to the index finger image, index value 2 is assigned to the middle finger image, etc.). After the user selects a particular finger(s) and finger image(s) to be associated with a specific mouse click operation, the control unit 33 stores the association in the memory of the device 10 (e.g., the left mouse click operation is associated with index value 1, etc.). After a touch from one of the user's fingers on the screen 32, the control unit 33 searches the finger images stored in the memory and the associations between these finger images and operations of the input pointing device operations that are stored in the memory.

With continued reference to FIG. 2, the control unit 33 correlates the contact of the first finger and the identified first finger image to a first action of a pointing input device to perform a first operation on the electronic device (at 130). This may be done with the pointing device operating module 42. For example, after a user touches the screen with that particular finger and the control unit 33 identifies the finger images associated with the finger, the control unit 33 compares the identified finger image(s) to finger image(s) that are stored in the database 80 and performs a search or any associations of these finger images. If the control unit 33 matches the identified finger image to a finger image in the memory that has an association, the control unit provides a command to the operating system 70 of the device 10 that translates that match to a mouse operation (e.g., via the index value assigned to the finger image).

Block 130 is repeated every time that the user contacts the display screen 32 with the first finger (or a portion of the finger) and the control unit 33 identifies a finger image associated with that finger based on the contact. In addition, the control unit 33 may correlate the contact of the second finger and the identified second finger image to a second action of the pointing input device to perform a second operation on the electronic device. That block may also be repeated every time that the user contacts the display screen 32 with the second finger. In other words, after the control unit 33 identifies a specific finger image associated with a finger, the control unit 33 retrieves the association of the first finger image or the second finger to the actions of the input pointing device to correlate the contact of the first finger and the second finger with the screen to the first action and the second action of the pointing input device.

Thus, by executing the process described above, the user's finger images operate as mouse clicks and can be used to control the operation of the electronic device 10. For example, the first action of the pointing input device that may be performed after the control unit 33 identifies the first finger image is a left mouse click. Further, the second action of the pointing input device that may be performed after the control unit 33 identifies the second finger image is a right mouse click. By correlating the contact of the first/second finger and the identified firsts/second finger image to the first/second action of a pointing input device, the control unit 33 translates the preselected finger images to mouse operations. The operations that are performed after the first image is identified correspond to all operations that may be executed with the left mouse button (i.e., left mouse click operations). In addition, the operations that are performed after the second image is identified correspond to all operations that may be executed with the right mouse button (i.e., tight mouse click operations, like opening a "context" menu from the GUI, etc.). This process allows the touch screen 32 to operate with pre-existing mouse driven software. This also allows for simple development of new applications, because no additional code or knowledge is required to develop software for use with the touch screen. New touch screen applications can be developed in the same way as mouse driven software.

Figure 4:
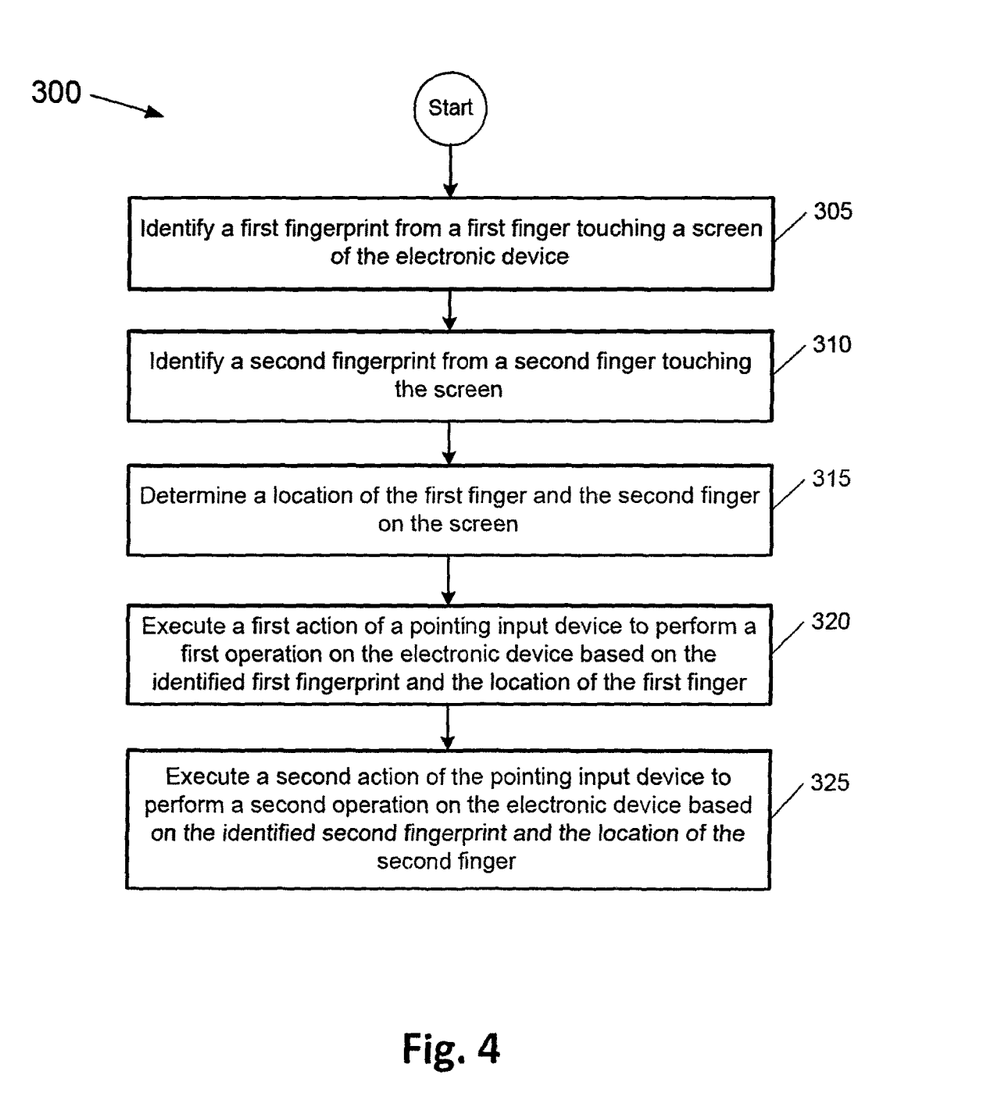
FIG. 4 illustrates a flow chart showing an example of an alternative method for controlling an electronic device in accordance with an implementation of the present disclosure.

FIG. 4 illustrates a flow chart showing an example of an alternative method 300 for controlling an electronic device. In one example, the method 300 can be executed by the control unit 33 of the processor of the electronic device 10. Various elements described herein with respect to the method 300 are capable of being executed simultaneously, in parallel, or in an order that differs from the illustrated serial manner of execution. Some of the elements of the method 300 are executed in a similar way to the blocks or elements of the method 100 that were described above.

The method 300 may be executed in the form of instructions encoded on a non-transitory machine-readable storage medium 37 executable by a processor 30 of the electronic device 10. In one example, the instructions for the method 300 implement the fingerprint detection module 40, the fingerprint processing module 41, and the pointing device operating module 42.

The method 300 begins at block 305 where the control unit 33 identifies a first fingerprint from a first finger touching a screen of the electronic device 10. The control unit 33 also identifies a second fingerprint from a second finger touching the screen (at 310). These blocks are executed in a similar way to blocks 110 and 120 of the method 100. As explained above in relation to method 100, the device 10 (e.g., the display screen 32) includes components 34 for detecting fingers and identifying fingerprints of the user. The control unit 33 then determines a location of the first finger and the second finger on the screen (at 315). In other words, the control 333 unit determines where exactly the user's finger(s) contacted the GUI on the screen (e.g., on an icon or an image on the GUI, on the start menu, on the middle of the black screen, etc.).

Next, the control unit 33 executes a first action of a pointing input device to perform a first operation on the electronic device 10 based on the identified first fingerprint and the location of the first finger (at 320). The control unit also executes a second action of the pointing input device to perform a second operation on the electronic device based on the identified second fingerprint and the location of the second finger (at 325). Blocks 320 and 325 are executed in a similar way to block 130 of the method 100. As noted above, the first and the second operations may be left and right mouse clicks of an input pointing device. In other words, based on the predetermined association of the first and the second finger images with the first and the second actions of the pointing input device (performed in accordance to method 200) and the identified location of the user's contact (e.g., an icon, start menu, etc.), the control unit 33 executes a specific operation that is dependent on the location of the user's touch. Thus, the electronic device 10 may execute one operation if the finger image associated with the right click is detected over an application icon (i.e., it can open a context menu associated with that application), and can perform a different operation if the finger image associated with the right click is detected over the start menu of the GUI (i.e., it can open "properties" menu).

As noted above, security is always a concern for users of electronic devices. Therefore, a main or authorized user of the device 10 may use the stored finger images as a security feature of the device. For example, the user may require an identification of his or her fingerprints by the device to allow access to the device. The user may determine a specific level of accuracy match or recognition of a finger image (e.g., 40%, 50%, 100%, etc.) in order to "unlock" the device. Therefore, using finger images as pointing input device allows a user to personalize his or her device and to assure that the device is only used by the main or authorized user.

Figure 5:
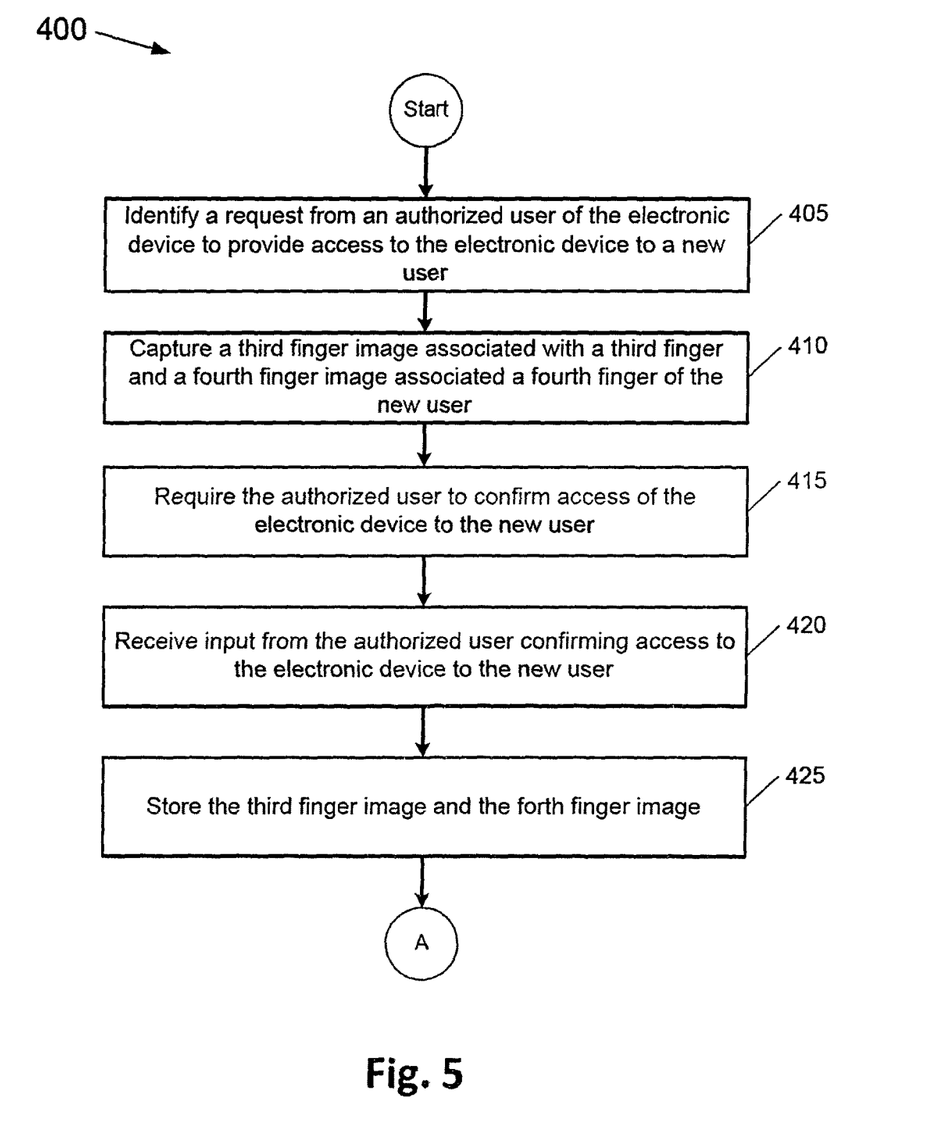
FIGS. 5 and 5A illustrate a flow chart showing an example of a method for providing an access to an electronic device to a new user from an authorized user in accordance with an implementation of the present disclosure.
Figure 5A:
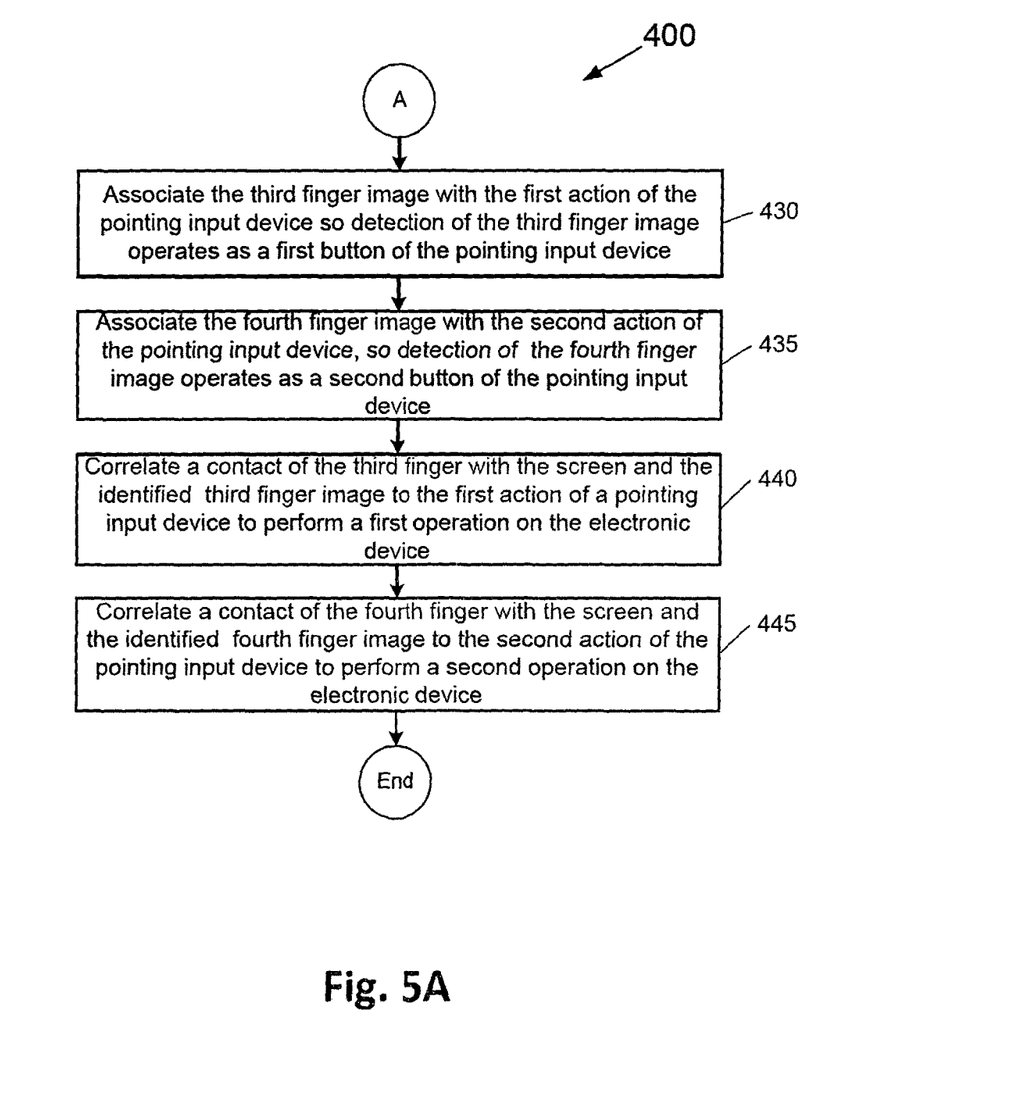

In some examples, main or authorized users of the electronic devices 10 may desire to share the access of the device 10 with another user and, at the same time, keep the main level of control of the device 10 to restrict the new user or add another new user at any time. FIGS. 5 and 5A illustrate a flow chart showing an example of a method 400 for providing an access to the electronic device to a new user from an authorized user. In one example, the method 400 can be executed by the control unit 33 in the form of instructions encoded on a non-transitory machine-readable storage medium 37.

The method 400 begins at block 405, where the control unit 33 identifies a request from an authorized user of the electronic device 10 to provide access to the electronic device 10 to a new user. In one example, the authorized user of the device 10 may use the GUI to place such a request. After receiving the request, the control unit 33 captures a third finger image associated with a third finger and a fourth finger image associated a fourth finger of the new user (at 410). In other words, the control unit 33 captures at least two finger images of the new user that are to be used in the process of controlling the device 10 described below. As noted above, this may be done with the electronic elements 34 of the device 10 when the user contacts the screen 32. The finger images of the new user may be fingerprints and the control unit can capture more than two finger images (e.g., when a user wants to store multiple fingerprints on the device 10). In one example, the third finger image of the new user is an index finger and the fourth finger image is a middle finger but other fingers may also be used.

At 415, the control unit 33 requires the authorized user to confirm access of the electronic device 10 to the new user. For example, a message box may be displayed on the display screen 32 to inform the main user that he or she needs to provide confirmation of the new user's access. Next, the control unit 33 receives input from the authorized user confirming access to the electronic device to the new user. In one implementation, the authorized user may enter a password (e.g., a string of characters). Alternatively, the authorized user may be required to use a finger image as the requested confirmation. In that case, the authorized user places his or her finger on the screen 32, the control unit 33 identifies the finger image, determines that this finger image is stored in the memory, and accepts the confirmation regarding the access of the new user.

At 425, the control unit 33 stores the third finger image and the forth finger image of the new user (e.g., in the database 80 of the device 10). That way, the electronic device 10 may update the "library" of finger images for the users of the device 10. The authorized user can add or remove finger images from the "library," and add or remove new users at any given time. Next, the control unit 33 associates the third finger image with the first action of the pointing input device so detection of the third finger image operates as a first button of the pointing input device (at 430), and associates the fourth finger image with the second action of the pointing input device so detection of the fourth finger image operates as a second button of the pointing input device (at 435). Blocks 430 and 435 are executed in a similar way to blocks 215 and 220 of the method 200.

It is to be understood that the control unit 33 may receive multiple finger images from the new user (or from multiple new users) and may associate any of the received finger images with any of the actions of the pointing input device. The association of the user's finger images with any of the mouse click operations may be performed via the GUI, where the new user or the authorized user may select a particular finger image or a combination of finger images to be associated with a specific mouse click operation.

Next, the control unit 33 correlates a contact of the third finger with the screen 32 and the identified third finger image to the first action of a pointing input device to perform a first operation on the electronic device (at 440). Also, the control unit 33 correlates a contact of the fourth finger with the screen 32 and the identified fourth finger image to the second action of the pointing input device to perform a second operation on the electronic device. These blocks are executed in a similar way to block 130 of the method 100. In other words, when the new user's finger touches the screen 32 and the control unit 33 identifies a finger image of that finger that is associated with an action of the pointing input device, the control unit 33 retrieves the association of the new user's finger image to the actions of the input pointing device to execute the action of the pointing input device and to perform an operation on the electronic device 10.

Thus, the new user's finger images operate as mouse clicks and can be used to control the operation of the electronic device 10. As noted above, the first action of the pointing input device that may be performed after the control unit 33 identifies the first finger image is a left mouse click and the second action of the pointing input device that may be performed after the control unit 33 identifies the second finger image is a right mouse click. By correlating the contact of the third/fourth finger and the identified third/fourth finger image to the first/second action of a pointing input device, the control unit 33 translates the preselected finger images to mouse operations as described above.

What is claimed is:

1. An electronic device, comprising:
a screen;
a sensor assembly; and
at least one processor to:
    process data from the sensor assembly indicating that a finger is contacting the screen;
    determine, based on an image of a first fingerprint of the finger, that the finger is a first finger of a user;
    process further data from the sensor assembly indicating that a second finger of the user is contacting the screen, the further data including an image of a second fingerprint of the second finger;
    determine that the image of the second fingerprint is associated with the second finger;
    determine a location of the first finger and a location of the second finger on the screen;
    correlate the contact of the first finger and the first fingerprint of the first finger to a first action of a pointing input device, based on the location of the first finger on the screen, to perform a first operation on the electronic device; and
    correlate the contact of the second finger and the second fingerprint to a second action of the pointing input device, based on the location of the second finger on the screen, to perform a second operation on the electronic device; and
    perform the first operation and the second operation on the electronic device in response to the correlating of the contact of the first finger and the correlating of the contact of the second finger.

2. The electronic device of claim 1, wherein the at least one processor is to:
    store the image of the first fingerprint of the first finger and the image of the second fingerprint of the second finger in a database;

associate, in the database, the stored image of the first fingerprint of the first finger with the first action of the pointing input device so detection of the image of the first fingerprint captured by the sensor assembly operates as a first button of the pointing input device; and associate, in the database, the stored image of the second fingerprint with the second action of the pointing input device so detection of the image of the second fingerprint captured by the sensor assembly operates as a second button of the pointing input device.

3. The electronic device of claim 1, wherein the at least one processor is to:

identify a request from an authorized user of the electronic device to provide access to the electronic device to a new user;

capture a first finger image associated with a first finger of the new user and a second finger image associated a second finger of the new user;

require the authorized user to confirm access of the electronic device to the new user; and receive input from the authorized user confirming access to the electronic device to the new user.

4. The electronic device of claim 3, wherein the at least one processor is to:

store the first finger image and the second finger image;

associate the first finger image with the first action of the pointing input device so detection of the first finger image operates as a first button of the pointing input device;

associate the second finger image with the second action of the pointing input device so detection of the second finger image operates as a second button of the pointing input device;

correlate a contact of the first finger of the new user with the screen and the identified first finger image to the first action of the pointing input device to perform the first operation on the electronic device; and correlate a contact of the second finger of the new user with the screen and the identified second finger image to the second action of the pointing input device to perform the second operation on the electronic device.

5. The electronic device of claim 1, wherein the pointing input device is a mouse, the first action is a left mouse click, the second action is a right mouse click, the first finger is an index finger, and the second finger is another finger different from the index finger.

6. A method for controlling an electronic device comprising:

receiving selection from a user from among a first touch operating mode and a second touch operating mode different from the first touch operating mode;

in response to selection of the first touch operating mode:

identifying a first fingerprint from a first finger touching a screen of the electronic device;

identifying a second fingerprint from a second finger touching the screen;

determining a location of the first finger and a location of the second finger on the screen;

executing a first action of a pointing input device to perform a first operation on the electronic device based on the identified first fingerprint and the location of the first finger;

executing a second action of the pointing input device to perform a second operation on the electronic device based on the identified second fingerprint and the location of the second finger; and in response to selection of the second touch operating mode, fingerprints of fingers of a user are not used to cause execution of actions of the pointing input device.

7. The method of claim 6, further comprising:

capturing, using a sensor assembly, the first fingerprint associated with the first finger and the second fingerprint associated with the second finger;

storing the first fingerprint and the second fingerprint in a database;

correlating, in the database, the first fingerprint with the first action of the pointing input device so detection of the first fingerprint operates as a first button of the pointing input device; and correlating, in the database, the second fingerprint with the second action of the pointing input device, so detection of the second fingerprint operates as a second button of the pointing input device.

8. The method of claim 6, further comprising:

identifying a request from an authorized user of the electronic device to provide access to the electronic device to a new user;

capturing a third fingerprint associated with a first finger of the new user and a fourth fingerprint associated with a second finger of the new user;

receiving input from the authorized user confirming access to the electronic device to the new user;

storing the third fingerprint and the forth fingerprint in a database;

correlating, in the database, the third fingerprint with the first action of the pointing input device so detection of the third fingerprint operates as a first button of the pointing input device; and correlating, in the database, the fourth fingerprint with the second action of the pointing input device, so detection of the fourth fingerprint operates as a second button of the pointing input device.

9. The method of claim 6, wherein the pointing input device is a mouse, the first action is a left mouse click, the second action is a right mouse click, the first finger is an index finger, and the second finger is another finger different from the index finger.

10. A non-transitory machine-readable storage medium encoded with instructions executable by at least one processor of an electronic device having a screen and a sensor assembly to detect a finger contacting the screen, the instructions upon execution causing the electronic device to:

process data from the sensor assembly indicating that a first finger and a second finger are contacting the screen, the data including an image a first fingerprint of the first finger and an image of a second fingerprint of the second finger;

identify, based on the data, the first fingerprint of the first finger and the second fingerprint of the second finger;

determine a location of the first finger and a location of the second finger on the screen;

correlate the contact of the first finger and the identified first fingerprint to a first action of a pointing input device, based on the determined location of the first finger, to perform a first operation on the electronic device; and correlate the contact of the second finger and the identified second fingerprint to a second action of the pointing input device, based on the determined location of the second finger, to perform a second operation on the electronic device.

11. The non-transitory machine-readable storage medium of claim 10, wherein the instructions upon execution cause the electronic device to:
- capture the image of the first fingerprint and the image of the second fingerprint;
- store the image of the first fingerprint and the image of the second fingerprint in a database;
- associate, in the database, the first fingerprint with the first action of the pointing input device so detection of the first fingerprint operates as a first button of the pointing input device; and
- associate, in the database, the second fingerprint with the second action of the pointing input device so detection of the second fingerprint operates as a second button of the pointing input device.

12. The non-transitory machine-readable storage medium of claim 10, wherein the instructions upon execution cause the electronic device to:
- identify a request from an authorized user of the electronic device to provide access to the electronic device to a new user;
- capture a first finger image associated with a first finger of the new user and a second finger image associated with a second finger of the new user;
- receive input from the authorized user confirming access to the electronic device to the new user;
- store the first finger image and the second finger image;
- associate the first finger image with the first action of the pointing input device so detection of the third finger image operates as a first button of the pointing input device; and
- associate the second finger image with the second action of the pointing input device so detection of the fourth finger image operates as a second button of the pointing input device.

13. The electronic device of claim 1, wherein the sensor assembly comprises a sensor or a plurality of sensors.

14. The method of claim 6, wherein:
- identifying the first fingerprint comprises using a sensor assembly to scan the first fingerprint of the first finger; and
- identifying the second fingerprint comprises using the sensor assembly to scan the second fingerprint of the second finger.

15. The method of claim 6, further comprising:
- identifying the first action of the pointing input device by accessing a database correlating the first fingerprint to the first action of the pointing input device; and
- identifying the second action of the pointing input device by accessing a database correlating the second fingerprint to the second action of the pointing input device.

16. The method of claim 6, wherein the screen is a touch sensitive display screen.

* * * * *

UNITED STATES PATENT AND TRADEMARK OFFICE
CERTIFICATE OF CORRECTION

| | | |
|---|---|---|
| PATENT NO. | : 10,013,595 B2 | Page 1 of 1 |
| APPLICATION NO. | : 15/100198 | |
| DATED | : July 3, 2018 | |
| INVENTOR(S) | : Bharathi Sreenivas | |

It is certified that error appears in the above-identified patent and that said Letters Patent is hereby corrected as shown below:

On the Title Page

In Column 2, item (57), Abstract, Line 1, after "example" insert -- of --.

In the Drawings

In sheet 1 of 6, FIG. 1, reference numeral 37, Line 7, delete "Operaing" and insert -- Operating --, therefor.

In the Claims

In Column 15, Line 18, Claim 3, after "associated" insert -- with --.

In Column 16, Line 51, Claim 10, after "image" insert -- of --.

Signed and Sealed this
Sixth Day of November, 2018

Andrei Iancu
*Director of the United States Patent and Trademark Office*